(12) United States Patent
Vadlakonda et al.

(10) Patent No.: US 9,094,520 B2
(45) Date of Patent: Jul. 28, 2015

(54) RECONFERENCING CAPABILITY FOR NETWORKED PHONES

(75) Inventors: Sravan Vadlakonda, Sunnyvale, CA (US); Ashish Chotai, Santa Clara, CA (US); Shantanu Sarkar, San Jose, CA (US); Aseem Asthana, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 2536 days.

(21) Appl. No.: 11/620,943

(22) Filed: Jan. 8, 2007

(65) Prior Publication Data

US 2008/0165945 A1    Jul. 10, 2008

(51) Int. Cl.
*H04M 3/42* (2006.01)
*H04M 3/56* (2006.01)

(52) U.S. Cl.
CPC ........ *H04M 3/56* (2013.01); *H04M 2203/2088* (2013.01)

(58) Field of Classification Search
CPC ....... H04M 3/56; H04M 3/563; H04M 3/564; H04M 3/566; H04M 3/567; H04M 2203/5063; H04M 2203/50; H04M 2203/5009; H04M 2203/5027; H04M 2203/5018; H04L 29/06027; H04L 29/06414; H04L 12/1813; H04L 12/1822; H04L 12/584
USPC ............. 379/202.01, 203.01, 204.01, 207.01; 370/260, 261, 262
See application file for complete search history.

(56) References Cited

U.S. PATENT DOCUMENTS

| 5,764,278 | A  | * | 6/1998 | Nagao ........................... 348/14.1 |
| 5,907,324 | A  | * | 5/1999 | Larson et al. ................. 715/753 |
| 6,564,261 | B1 | * | 5/2003 | Gudjonsson et al. ......... 709/227 |
| 2003/0059022 | A1 | * | 3/2003 | Nebiker et al. ............... 379/219 |
| 2008/0037746 | A1 | * | 2/2008 | Dufrene et al. .......... 379/201.01 |
| 2008/0069011 | A1 | * | 3/2008 | Sekaran et al. ............... 370/260 |

* cited by examiner

*Primary Examiner* — Antim Shah
(74) *Attorney, Agent, or Firm* — P. Su (57) ABSTRACT

In one embodiment, a method comprises storing information associated with a conference call that has previously been terminated. The method also comprises obtaining a request to re-establish the terminated conference call, and re-establishing the conference call in response to the request to re-establish the conference call. Re-establishing the conference call comprises using the stored information to set a first set of states associated with the re-established conference call.

21 Claims, 9 Drawing Sheets

RECONFERENCING CAPABILITY FOR NETWORKED PHONES

BACKGROUND OF THE INVENTION

The technical disclosure relates generally to voice conferencing.

Voice over Internet Protocol (VoIP) utilizes a packet-switched network to transport voice data. Internet Protocol (IP) telephones and software-implemented telephones are connected directly to a packet network may communicate using VoIP. Like conventional telephones, such as those connected through a Public Switched Telephone Network (PSTN) or a Private Branch Exchange (PBX) to a packet voice gateway, IP telephones generally include redial functionality that allows a user to effectively recreate a recent point-to-point telephone connection. In other words, redial functionality facilitates the recreation or re-establishment of a terminated point-to-point telephone connection such that a party may efficiently re-establish communication with another party.

BRIEF DESCRIPTION OF THE DRAWINGS

The technical disclosure may best be understood by reference to the following description taken in conjunction with the accompanying drawings in which.

DESCRIPTION OF THE EXAMPLE EMBODIMENTS

General Overview

In one embodiment, a method comprises storing information associated with a conference call that has previously been terminated. The method also comprises obtaining a request to re-establish the terminated conference call, and re-establishing the conference call in response to the request to re-establish the conference call. Re-establishing the conference call comprises using the stored information to set a first set of states associated with the re-established conference call.

Description

After a conference call between two or more parties is terminated, the conference call generally may not be re-established without either rescheduling the conference call using a conference server, or by manually re-establishing an ad hoc conference, e.g., an unscheduled conference that a moderator or conference owner creates by manually establishing a connection with each party. While such methods for re-establishing a conference call are generally effective, such methods are typically relatively time consuming, particularly when a conference call includes a significant number of participants.

Allowing a previous conference call, e.g., a conference call that has been terminated either purposefully or prematurely, to be recreated efficiently may involve providing one or more options on an internet protocol (IP) such as a voice over IP (VoIP) phone that provides functionality to re-establish the previous conference call. The functionality to substantially automatically re-establish a previous conference call may be provided on an IP phone, or substantially any networked phone, using a button that may be selected when a previous conference call is to be re-established. Once the button is selected, the phone or, more generally, the endpoint, may contact an associated conference server that is arranged to re-establish the previous conference call.

A "reconference" button of an endpoint such as an IP phone may be arranged to dial a phone number associated with the last conference in which the endpoint participated, or may bring up a menu that enables a selection of a conference to be made from a list of recent or previous conferences. That is, selecting the reconference button may cause the last conference in which the endpoint participated to be substantially automatically re-established, or may initiate a process that subsequently results in the re-establishment of a previous conference.

A reconference key or button may be implemented as a substantially separate button from a "redial" key or button that is used to recreate terminated point-to-point calls. However, it should be appreciated that the redial button of a phone may be arranged to be used to re-establish a previous conference call. By way of example, reconferencing functionality that is used to re-establish a conference call between at least two participants may be accessed, in one embodiment, by double clicking the redial button, while one click of the redial button may cause a previous point-to-point connection to be re-established.

Figure 1A:
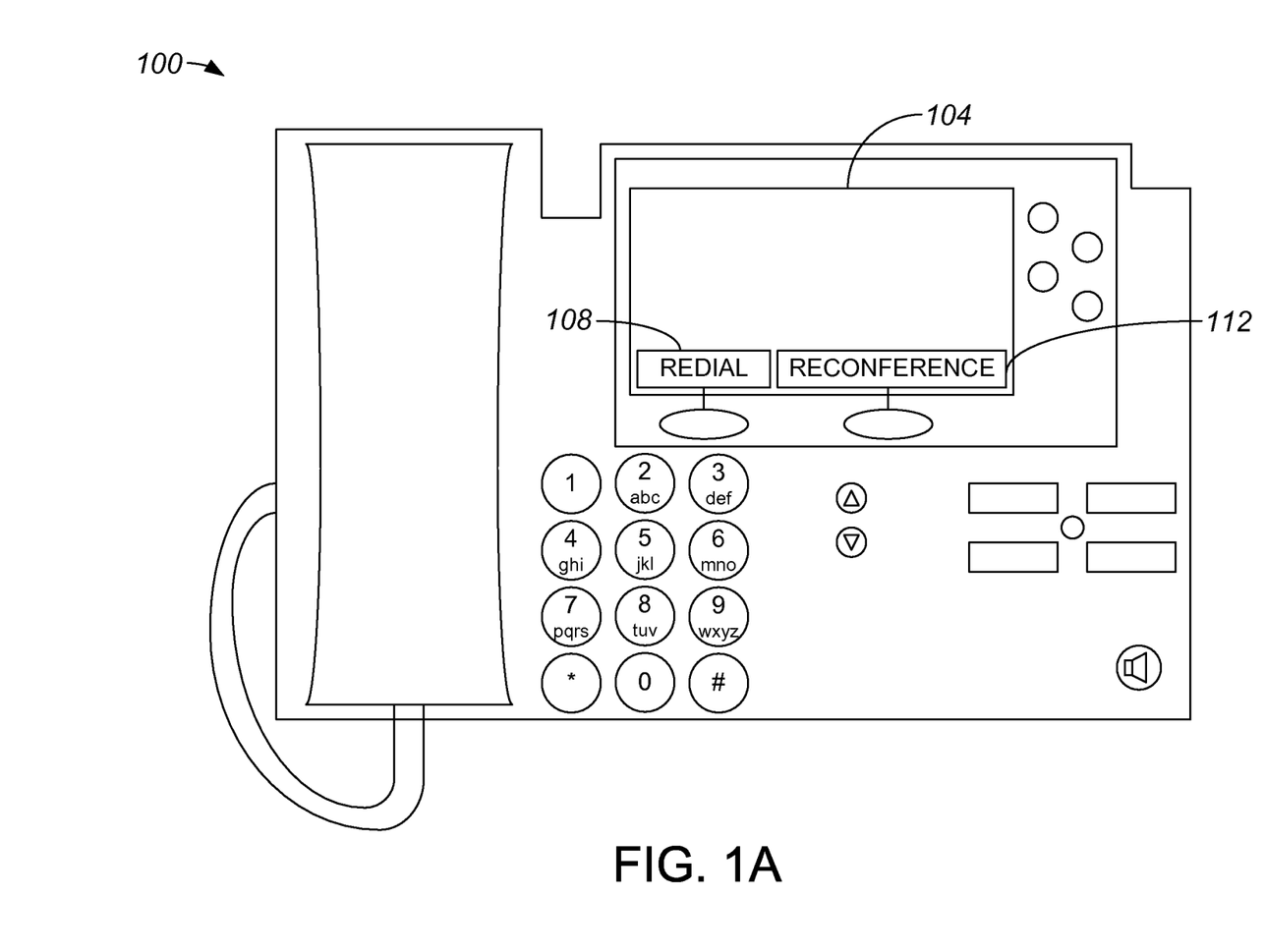
FIG. 1A is an example of a networked phone with a reconference button.

FIG. 1A is an example of an IP phone which includes a reconference key or button. An IP phone 100 includes a display screen 104 which may be used to display information relating to current and previous phone calls. A redial button 108, when selected, may allow the last point-to-point communications connection between phone 100 and a conference server (not shown) to be substantially automatically re-established. Alternatively, selecting redial button 108 may cause a set of previously dialed phone numbers to be displayed on screen 104. A user may select a previously dialed phone number from those displayed on screen 104.

Phone 100 includes a reconference button 112 that, when selected, may either cause the last conference call of which phone 100 was part to be re-established, or cause a list of previous conference calls to be displayed on screen 104. If selecting reconference button 112 causes a list or a history of previous conference calls to be displayed on screen 104, then a user may select one of the listed previous conference calls to be re-established.

Figure 1B:
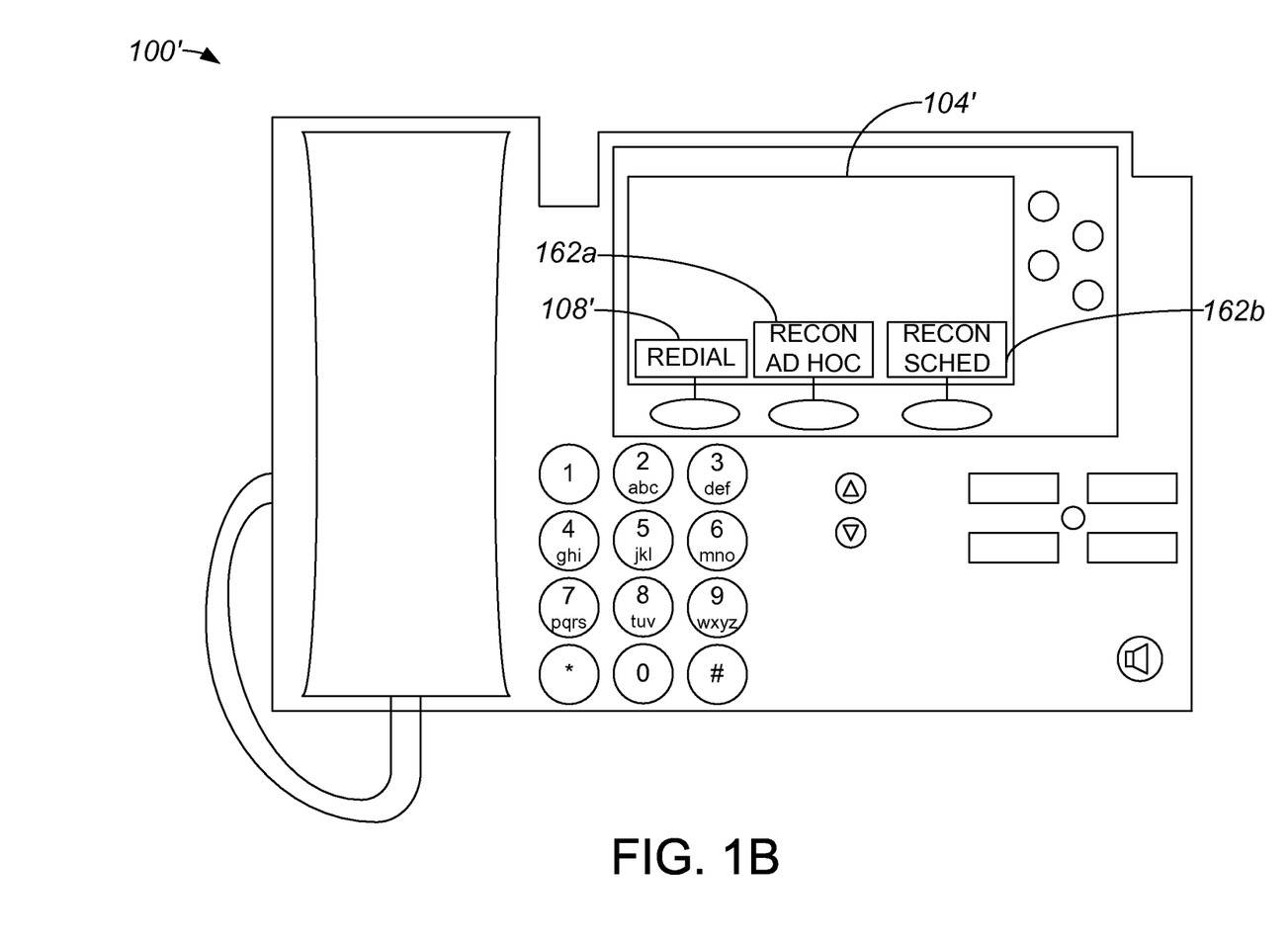
FIG. 1B is an example of a networked phone with a reconference button associated with ad hoc conferences and a reconference button associated with scheduled conferences.

In the described embodiment, previous conference calls that may be re-established when reconference button 112 is selected may include both terminated scheduled conference calls and terminated ad hoc conference calls. With reference to FIG. 1B, an example of an IP phone which includes separate reconference buttons for prior scheduled conference calls and prior ad hoc conference calls which have previously occurred. An IP phone 100' includes a redial button 108', a first reconference button 162a, and a second reconference button 162b. When a user selects redial button 108', a previous point-to-point connection involving phone 100' may be re-established.

First reconference button 162a is associated with previous ad hoc, or unscheduled, conference calls, and second reconference button 162b is associated with previous scheduled conference calls. Hence, when a user selects first reconference button 162a, the most recent ad hoc conference call to which phone 100' was connected may be re-established. Alternatively, a list of previous ad hoc conference calls to which phone 100' was connected may be listed on display screen 104' such that a user may select a previous ad hoc conference call to re-establish. Similarly, when a user selects second reconference button 162b, either the most recent scheduled conference call to which phone 100' was connected may be re-established, or a list of previous scheduled conference calls may be displayed on display screen 104' such that the user may select a particular previous scheduled conference call to re-establish.

Figure 2:
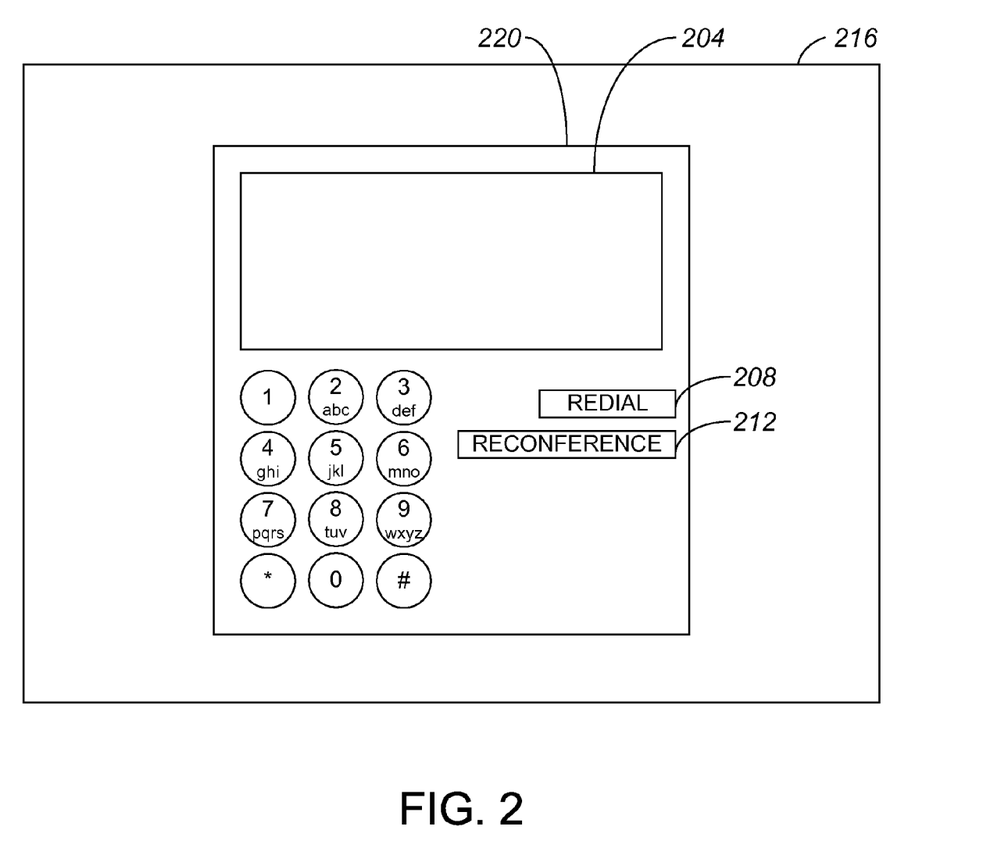
FIG. 2 is an example of a phone with a reconference button that is implemented as a computer-based software phone.

Although phone 100 of FIG. 1A and phone 100' of FIG. 1B are physical phones, reconferencing functionality may also be implemented in phones that are implemented within a computing device. FIG. 2 is an example of a computer-implemented phone that supports reconferencing functionality. A display apparatus 216 of a computing system includes a phone display 220. Phone display 220 includes a redial button 208 that is a soft key and a reconference button 212 that is also a soft key. It should be appreciated that although one reconference button 212 is shown, phone display 220 may include more than one reconference button 212. By way of example, phone display 220 may include separate reconference buttons for re-establishing terminated ad hoc conference calls and terminated scheduled conference calls.

When a user selects reconference button 212, reconferencing capabilities are initiated. In one embodiment, the most recently terminated conference call with which the computing system was involved is substantially automatically re-established when reconference button 212 is selected. Alternatively, a list of the most recently terminated conference calls with which the computing system was involved is displayed on screen 204 such that the user may select which terminated conference call to re-establish.

Figure 3:
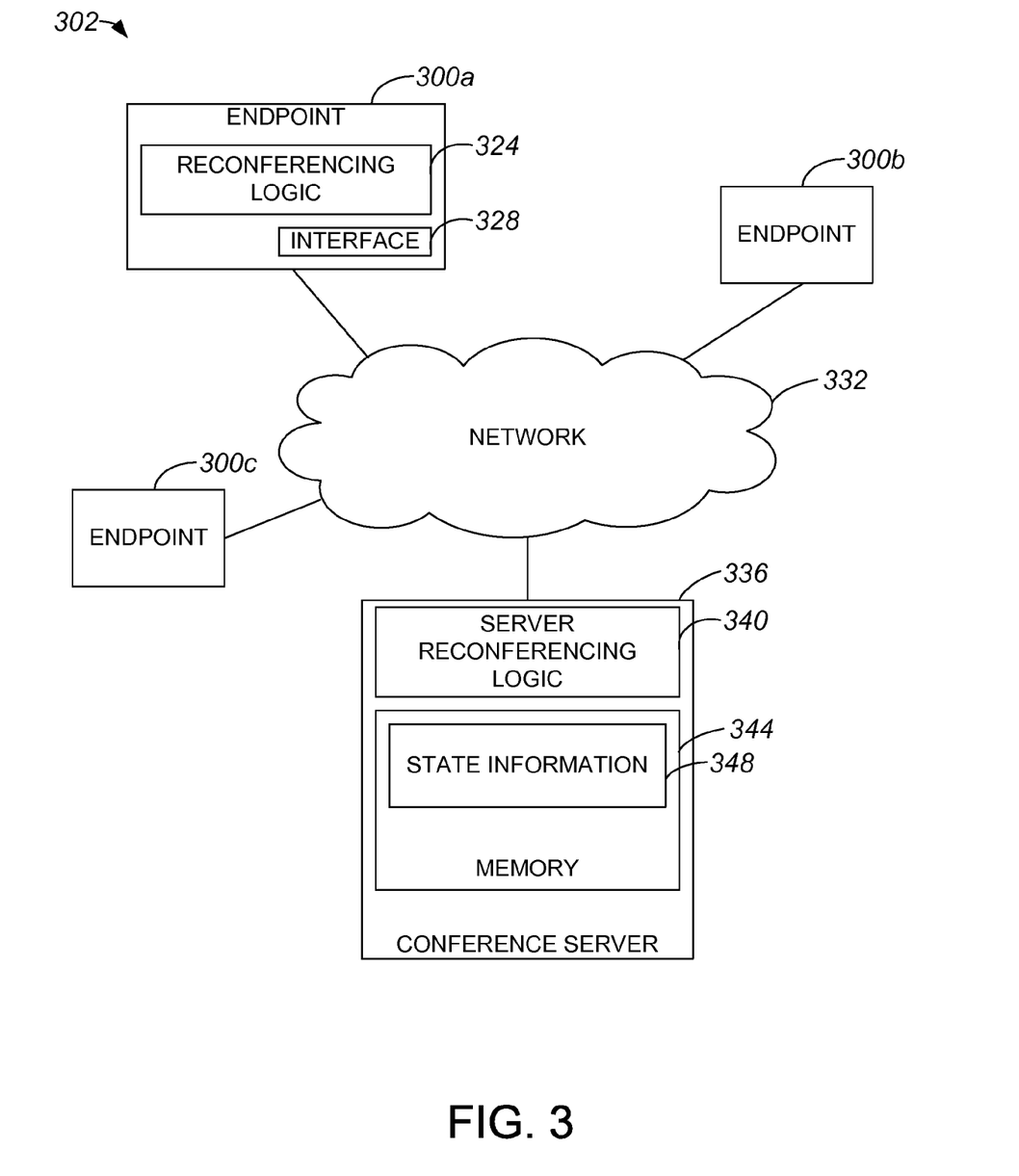
FIG. 3 is a block diagram representation of an overall system which supports reconferencing.

In general, a system that supports reconferencing includes endpoints which have reconferencing logic, as well as a conference server which also has reconferencing logic. Referring next to FIG. 3, a system that supports reconferencing will be described in accordance with an embodiment of the present invention. A system 302 includes endpoints 300a, 300b and a conference server 336. Endpoints 300a, 300b may include resources such as phones, e.g., IP or networked phones, or devices with phone capabilities including, but not limited to, computing devices, e.g., personal computers, and mobile clients such as laptops, personal digital assistants (PDAs), and wireless IP phones.

Endpoint 300a includes reconferencing logic 324 that is embodied in a tangible media. Hence, endpoint 300a may initiate a reconferencing process, e.g., endpoint 300a has moderator capabilities associated with re-establishing a terminated conference call. Reconferencing logic 324 may include software code devices and/or hardware devices. It should be appreciated that while endpoints 300b may also include reconferencing logic, endpoints 300b may not necessarily include reconferencing logic. If endpoints 300b include reconferencing logic, then endpoints 300b have the capability to re-establish terminated conference calls. It should be appreciated that even if endpoints 300b have the capability to re-establish terminated conference calls, system 302 may be such that the capability to re-establish terminated conference calls is substantially only active in selected endpoints 300a, 300b. In other words, even if endpoints 300b have reconferencing logic, permission to re-initiate terminated conference calls may be denied to endpoints 300b if endpoints 300b do not have moderator status relating to certain terminated conference calls. In one embodiment, a moderator associated with endpoint 300a may assign the ability to re-establish terminated conference calls to endpoints 300b, e.g., endpoint 300a may be used to activate reconferencing logic in endpoints 300b if endpoints 300b include reconferencing logic.

Reconferencing logic 324 allows endpoint 300a to interact with conference server 366 to re-establish terminated conference calls. Reconferencing logic 324 may also include logic that enables a list or history of terminated conference calls to be maintained on endpoint 300a, as well as logic that allows a reconference key to initiate the display of a user interface that obtains user input. An interface 328 of endpoint 300a allows endpoint 300a to communicate with conference server 336 through a network 332. Interface 328 may include wired or wireless communications channels, as well as a dialing interface that enables endpoint 300a to dial into or to establish a conference call. Network 332 may be any suitable network, as for example an IP network or an asynchronous transfer mode (ATM) network. It should be appreciated, however, that the type of network used to carry conference traffic may vary widely.

Conference server 336 is arranged to manage conference calls in which endpoints 300a, 300b may participate, and includes server reconferencing logic 340. Conference server 336 also includes a memory 344 in which state information 348 pertaining to conference calls which have occurred within system 302 may be stored. State information 348 may be stored in data structures, e.g., tables, and may include, but is not limited to including, information that identifies endpoints 300a, 300b which have participated in certain terminated conference calls, and information that indicates which type the certain terminated conference calls are. As will be appreciated by those skilled in the art, a conference call may be an audio conference call, a video conference call, a web-based conference call, and/or a chat-based or text-based conference call.

In general, a single conference call may have multiple modalities. Modalities, for instance, may include sidebars involving text chats and/or audio chats in addition to an overall conference type. For instance, a video conference call may include sidebars involving text chats and audio chats. State information 348 may store information pertaining to modalities which were associated with a terminated conference call at the time the conference call was terminated.

Figure 4:
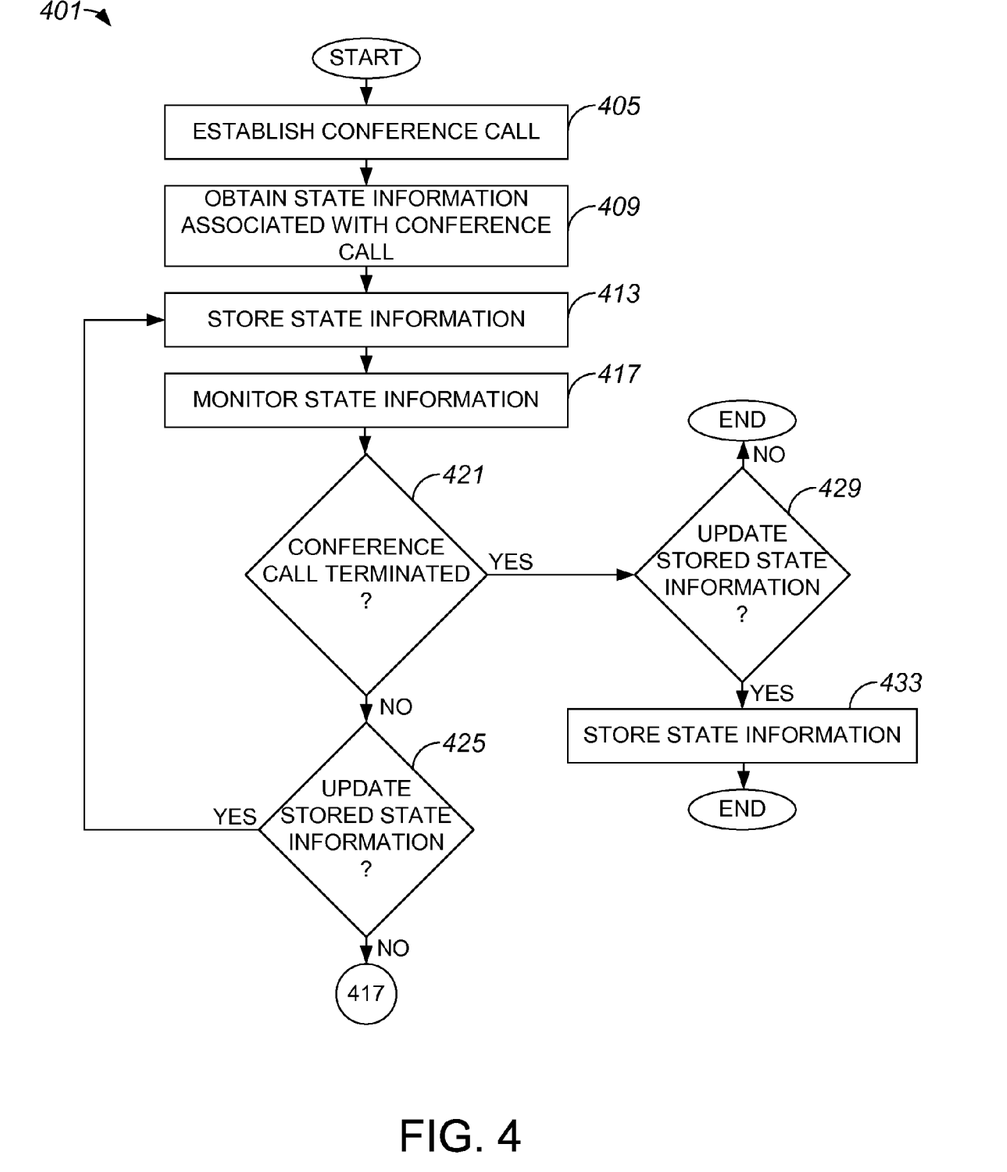
FIG. 4 is a process flow diagram which illustrates a method of processing a conference call using a conference server.

With reference to FIG. 4, the steps associated with one method of processing a conference call from the point of view of a conference server, e.g., conference server 336 of FIG. 3, will be described in accordance with an embodiment of the present invention. A method 401 of processing a conference call begins at step 405 in which a conference call is established by a conference server. The conference call may generally be established using any suitable method. By way of example, the conference server may establish a conference session when participants dial into a scheduled meeting using a meeting identifier. Alternatively, the conference server may establish a conference session in an ad hoc manner when an initiator of the conference session may call each participant and effectively add each participant to the conference session.

Once the conference call is established, the conference server obtains state information associated with the conference call in step 409. The state information may include, but is not limited to, information relating to IP addresses or phone numbers associated with participants in the conference call, information relating to sidebars involving participants in the conference call, and information relating to the format of the conference call, e.g., information which indicates whether the conference call is a video conference call or an audio conference call. In general, state information may be obtained from data transmitted by to the conference server from endpoints, or from information stored in the conference server.

After state information associated with the conference call is obtained, the conference server stores information in step 413. The information may be stored in a data structure in a memory of the conference server with information that identifies the conference call. The conference server monitors state information in step 417 and, in step 421, the conference server determines if the conference call has been terminated. The conference call may be terminated when participants in the conference call have determined that the conference call is completed or finished. Alternatively, the conference call may be terminated prematurely, as for example due to a loss of connection.

It if is determined in step 421 that the conference call is not terminated, the conference server determines whether the stored state information is to be updated in step 425. The conference server may update stored state information periodically, e.g., based on predetermined time intervals, and/or substantially any time the conference server determines that there has been a change in state information.

If the determination in step 425 is that the stored state information is to be updated, then process flow returns to step 413 in which the conference server stores the current state information. On the other hand, if it is determined that the stored state information is not to be updated, then the conference server continues to monitor state information in step 417.

Returning to step 421, if the conference server determines that the conference call has been terminated, then the conference server determines in step 429 whether the stored state information is to be updated. If the stored state information is not to be updated, the method of processing the conference call is completed. Alternatively, if the stored state information is to be updated, the state information at approximately the time the conference call was terminated is stored in step 433, and the method of processing the conference call is completed.

Figure 5:
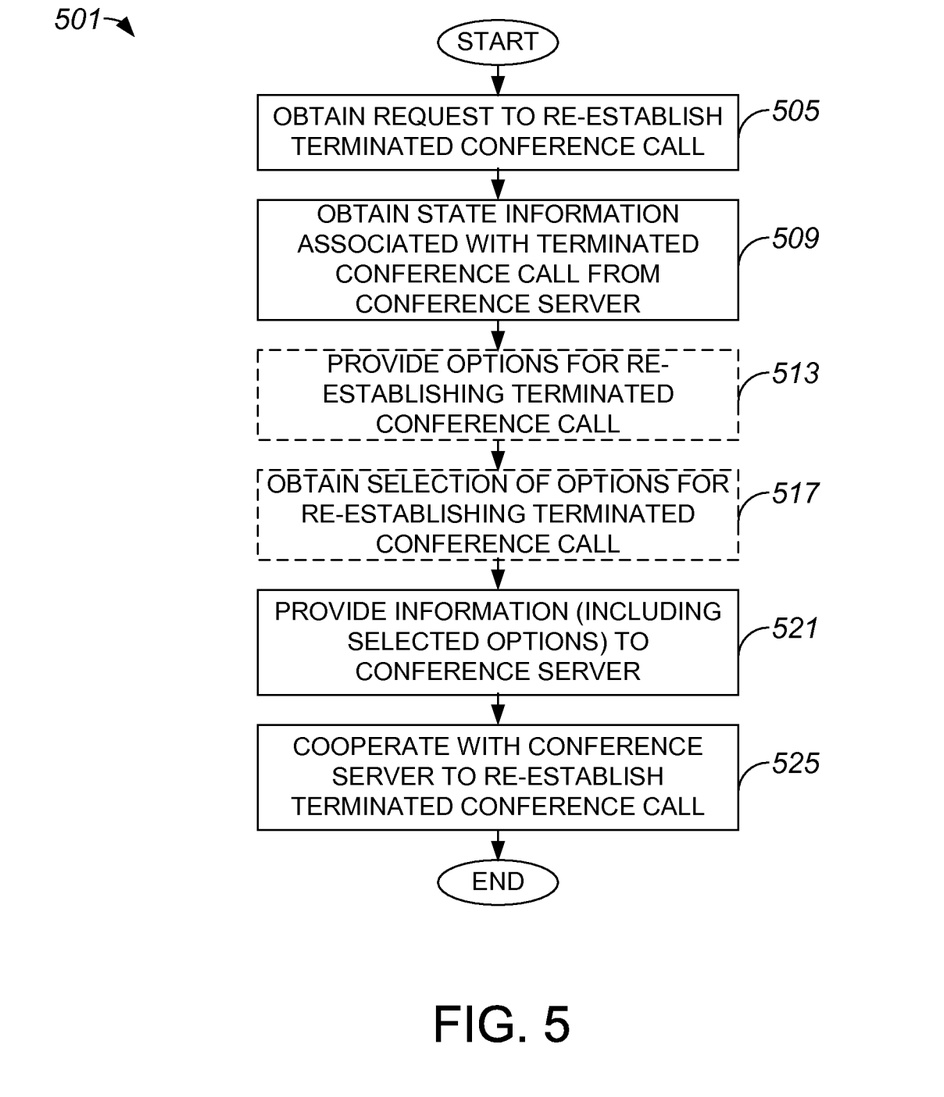
FIG. 5 is a process flow diagram which illustrates a method of re-establishing a conference call using an endpoint

When a user of an endpoint wishes to re-establish a terminated conference call, the user may select a reconferencing option using the endpoint. FIG. 5 is a process flow diagram which illustrates a general method of re-establishing a conference call through an endpoint. A process 501 of re-establishing a conference call begins at step 505 in which an endpoint obtains, e.g., receives, a request to re-establish a terminated, or previous, conference call. A request to re-establish a terminated conference call may be obtained by the endpoint when a user selects a reconferencing option using the endpoint. After the request is obtained, the endpoint obtains state information associated with the terminated conference call in step 509. That is, the endpoint obtains state information pertaining to the terminated conference call that is to be re-established. The state information is, in one embodiment, on the conference server that supported the terminated conference call.

Once the endpoint obtains state information associated with the terminated conference call, the endpoint may provide the user with options in step 513 for re-establishing the terminated conference call. Such options, as will be described below with respect to FIG. 6, may include allowing the user to select a format of a conference call, as well as participants in the conference call. The endpoint may provide the user with the options by displaying appropriate menus on a display screen.

In step 517, the endpoint obtains a selection of options from the user. Then, the endpoint provides information to the associated conference server in step 521 that the conference server may use to re-establish the terminated conference call. The information provided by the endpoint may include information pertaining to the options for re-establishing the terminated conference call that were selected by the user. After the information is provided to the conference server, the endpoint cooperates with the conference server in step 525 to re-establish the terminated conference call. Upon re-establishing the conference call, the process of re-establishing a conference call is completed.

Figure 6:
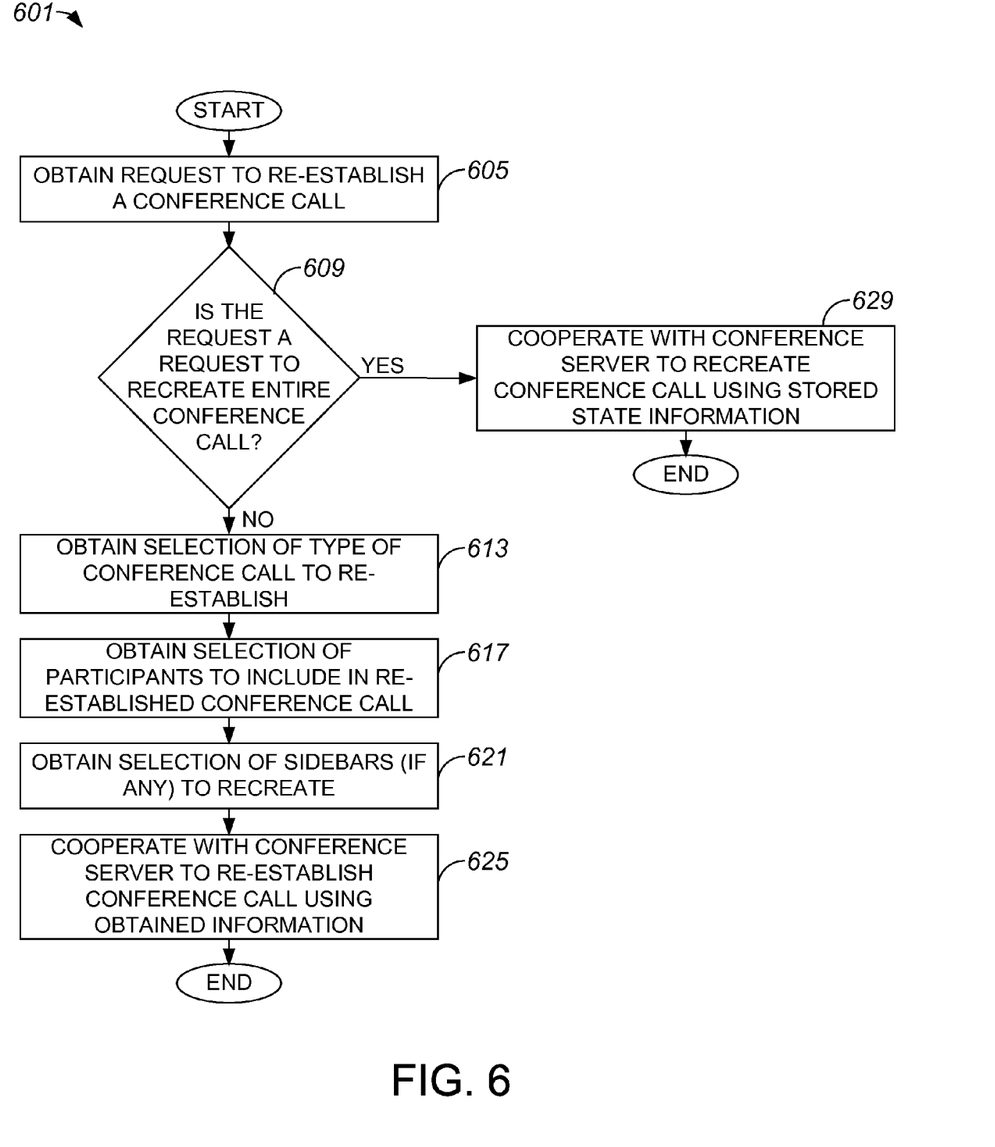
FIG. 6 is a process flow diagram which illustrates a method of re-establishing a conference call in which options for use in re-establishing the conference call may be specified.

As previously mentioned, options that may be used in re-establishing a terminated conference call may include allowing the user to select a format of a conference call, as well as participants in the conference call. Referring next to FIG. 6, one particular method of re-establishing a terminated conference call that involves the selection of conference call options including a conference call format as well as participants will be described in accordance with an embodiment of the present invention. A process 601 of re-establishing a conference call begins at step 605 in which an endpoint obtains a request to re-establish a conference call. The request may be obtained through substantially any type of user interface.

The endpoint determines in step 609 if the request to re-establish the conference call is a request to recreate the entire conference call. That is, a determination is made in step 609 regarding whether a previous conference call that was terminated when in a given state is to be re-established in that state. If it is determined that the entire conference call is to be recreated, then process flow moves to step 629 in which the endpoint cooperates with a conference server to recreate the conference call using stored state information. In general, the state information is stored in a memory that is a part of, or is otherwise associated with, the conference server. Once the conference call is recreated, the process of re-establishing a conference call is completed.

Alternatively, if it is determined in step 609 that the entire conference call is not be recreated, the indication is that a variation of the conference call is to be re-established. Accordingly, in step 623, the endpoint obtains a selection of a type of conference call to re-establish. In one embodiment, such a selection may be made though a user interface. Types of conference calls that may be re-established may include, but are not limited to, video conference calls, audio-visual conference calls, audio conference calls, and chat-based or text-based conference calls. A user may elect to re-establish a conference call in a different format, for example, if the original conference call was terminated due to a failure of a different format.

After the endpoint obtains a selection of a type of conference call to re-establish, the endpoint obtains a selection of participants to include in the re-established conference call in step 617. Once the selection of participants is obtained, the endpoint obtains a selection of sidebars, if any, to recreate in step 621. By way of example, if a subset of participants in the original conference call were involved in a separate discussion or sidebar, the sidebar may be re-established as a part of re-establishing the conference call. It should be appreciated that even if there was a sidebar associated with the original conference call, the sidebar may not necessarily be re-established when the conference call is re-established.

In step 625, the endpoint cooperates with the conference server to re-establish the conference call using the obtained information. In other words, the conference call may be re-established by the conference server using the type selected in step 613, the participants selected in step 617, and any sidebars selected in step 621. Upon re-establishing the conference call, the process of re-establishing the conference call is completed.

Figure 7A:
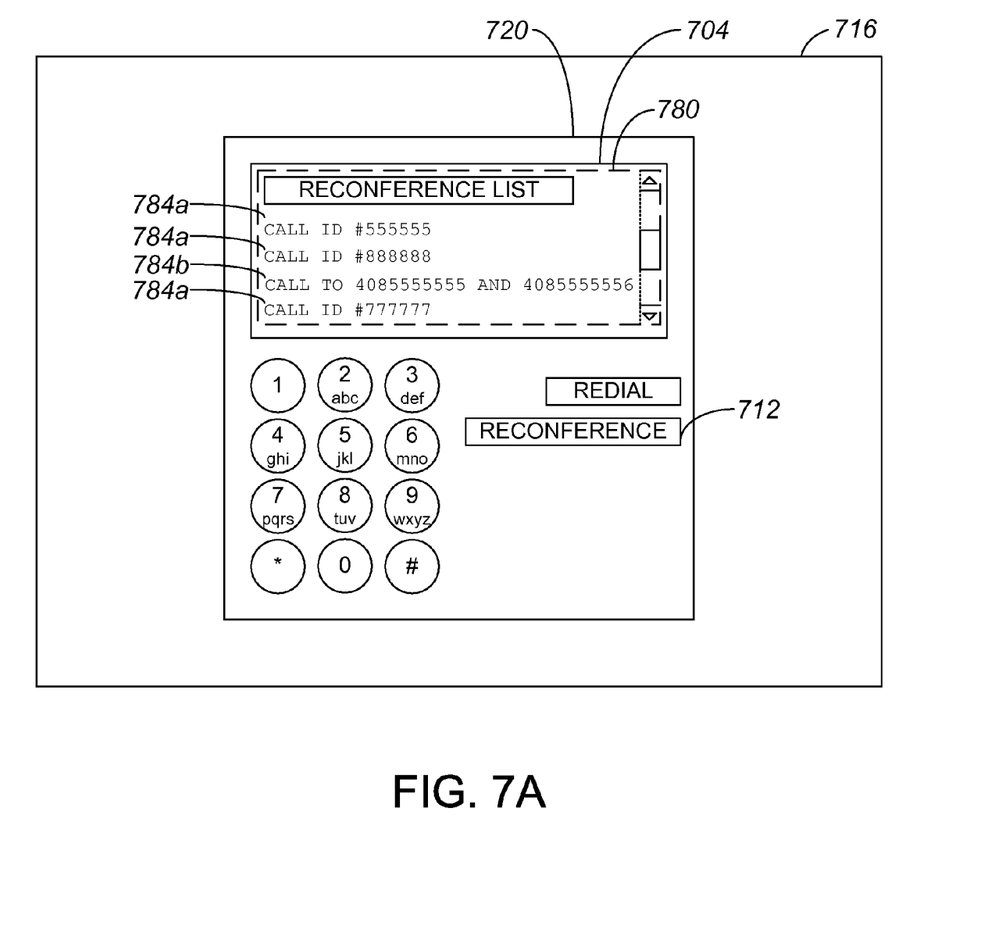
FIG. 7A is an example of a phone that is implemented as a computer-based software phone which enables a terminated conference to be re-established or recreated.
Figure 7B:
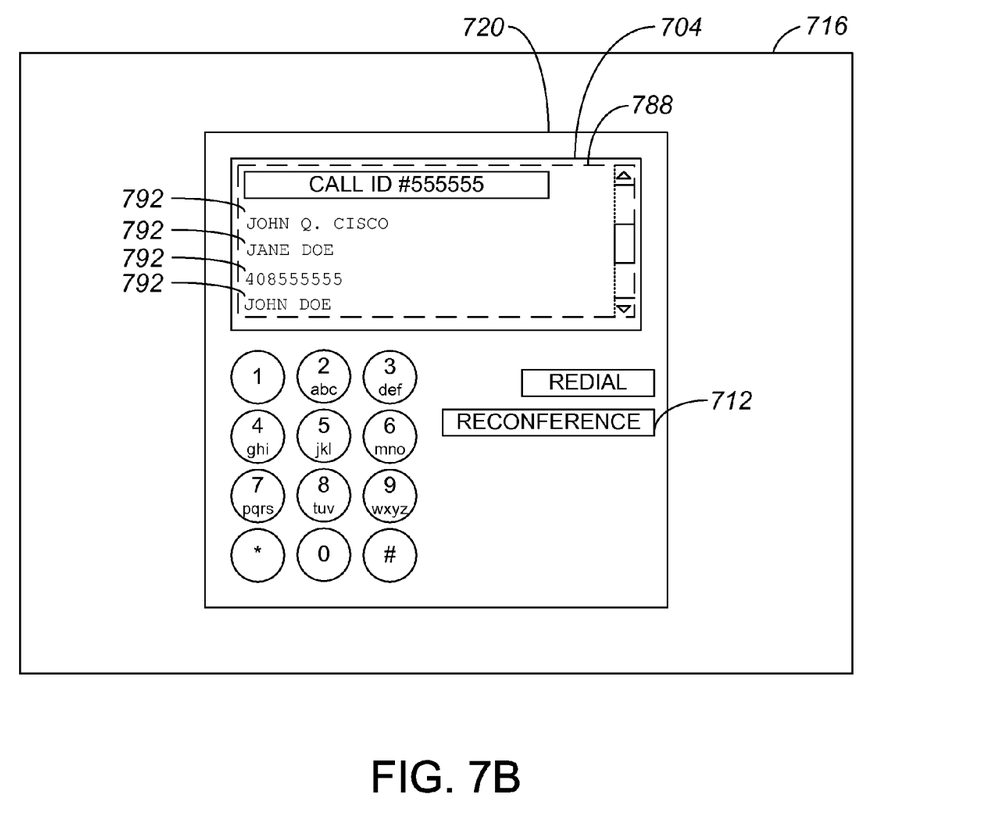
FIG. 7B is an example of a phone, e.g., phone 716 of FIG. 7A, that is implemented as a computer-based software phone which allows participants who are to be included in a re-established or recreated conference to be selected.

The user interface that is used to facilitate re-establishing a conference call may vary widely. In one embodiment, a user is presented with menus that may be used to re-establish a conference call. With reference to FIGS. 7A and 7B, examples of menus which may be used on networked phone systems to re-establish a conference call will be described in accordance with an embodiment of the present invention. FIG. 7A is an example of a display associated with a computer-based software phone on which a menu interface that enables a terminated conference to be re-established is displayed. A display 712 includes an interactive phone arrangement 720 with at least one reconference button 712. When reconference button 712 is selected, a reconference list 780 is displayed in a screen 704. Reconference list 780 lists conference identifiers 784a, 784b associated with previous conference calls which were associated with interactive phone arrangement 720.

Reconference list 780, as shown, includes both previous scheduled conferences 784a and previous ad hoc conferences 784b, although it should be appreciated that separate reconference lists may generally be created for previous scheduled conferences 784a and previous ad hoc conferences 784b. The number of previous conferences 784a, 784b displayed in reconference list 780 may vary widely. By way of example, reconference list 780 may be arranged to determine up to a predetermined number of previous conferences 784a, 784b, or reconference list 780 may display substantially all previous conferences 784a, 784b which occurred during a predetermined time period. In addition to displaying identifiers for previous conferences 784a, 784b, reconference list 780 may also display other information (not shown) including, but not limited to, a times and dates associated with previous conferences 784a, 784b.

A user may select a previous conference 784a, 784b to re-establish. Upon selecting a previous conference 784a, 784b to re-establish, the user may be presented with a menu that lists participants associated with the selected previous conference 784a, 784b, as shown in FIG. 7B. A list 788 that identifies participants 792 who may be selected for inclusion in a re-established version of a previous or terminated conference call is displayed in screen 704 once the previous conference call is selected. Participants 792 may include either all participants who were involved in the previous conference call at some point, or a subset of such participants, e.g., participants who were involved in the previous conference call at approximately the time of termination. Participants 792 may be identified by indicators such as their names, their user identifiers, or phone numbers. Typically, the order in which participants 792 are listed in list 788 may vary widely.

Although only a few embodiments of the present invention have been described, it should be understood that the present invention may be embodied in many other specific forms without departing from the spirit or the scope of the present invention. By way of example, while reconferencing capabilities have generally been described as being provided in a system which utilizes networked phones such as IP phones of other softphones, reconferencing capabilities may be provided in substantially any system which provides conferencing or multipoint communications functionality. An instant messaging application which includes a terminated group chat to be re-established may be associated with multipoint communications functionality. In other words, the present invention is not limited to use with networked phones that are in communication with a conference server.

A reconference button or, more generally, a user interface is not limited to being displayed on a phone. In general, a reconference button may be displayed as a part of substantially any application in which re-establishing previous conference connections may be desired without departing from the spirit or the scope of the present invention. By way of example, a soft key associated with re-establishing previous conference connections may be included in a display associated with an instant messaging client, or in a display associated with a conference control web page.

While substantially any previous or terminated conference calls may be re-established, certain conference calls may effectively be flagged as being likely to be re-established. For instance, stored state information associated with a conference call may include an indication of the quality of the conference call. If the indicated quality, e.g., audio quality, of a terminated conference call is poor, the conference call may be flagged such as being likely to be re-established.

In one embodiment, terminated conference calls may be separated into previously received conference calls and previously dialed conference calls. Such a list may be stored in an endpoint, and displayed on a screen as a user interface. The selection of an entry in the list may automatically cause the associated conference call to be re-established.

Typically, when a user selects participants to include in a re-established conference call, the list of participants from which the user may make his or her selection may include either those participants who were involved with the associated terminated conference call at the time of termination, or substantially all participants who were involved with the terminated conference call at any time. It should be appreciated, however, that in some instances, other parties may be included as participants. For example, potential participants that may be included in a re-established conference call may include parties who were invited to the terminated conference call but were not actually involved in the terminated conference call.

The steps associated with the methods of the present invention may vary widely. Steps may be added, removed, altered, combined, and reordered without departing from the spirit of the scope of the present invention. By way of example, a method of re-establishing a conference call may not necessarily provide a user with options for re-establishing a terminated conference call. In some embodiments, an overall system may be such that terminated conference calls are arranged to be re-established in substantially the same state that was in existence when termination occurred. Therefore, the present examples are to be considered as illustrative and not restrictive, and the invention is not to be limited to the details given herein, but may be modified within the scope of the appended claims.

What is claimed is:

1. A method comprising:
storing information associated with a conference call in a memory of a conference server, wherein the conference call is terminated, the information being state information at a time of termination for the conference call, wherein storing the information associated with the conference call includes updating previously stored information associated with the conference call, and wherein the information is stored to enable access to the information when re-establishing the conference call in its entirety and the information comprises a second set of states associated with the conference call, the second set of states including the state information at the time of termination for the conference call;

obtaining a request to re-establish the conference call on an endpoint;

determining when the request to re-establish the conference call is a request to recreate the conference call in its entirety;

re-establishing a variation of the conference call using the conference server when it is determined that the request to re-establish the conference call is not the request to recreate the conference call in its entirety; and re-establishing the conference call in its entirety using the conference server upon obtaining the request to re-establish the conference call when it is determined that the request to re-establish the conference call is the request to recreate the conference call in its entirety, wherein re-establishing the conference call in its entirety comprises using the information to set a first set of states, the first set of states including an overall type of the conference call and at least one modality of the conference call, the first set of states being set to be the second set of states, wherein re-establishing the conference call in its entirety using the conference server causes participants in the conference call at the time of termination of the conference call to be involved in the re-established conference call.

2. The method of claim 1 wherein re-establishing the conference call in its entirety comprises automatically re-establishing the conference call in response to the request, wherein the overall type of the conference call includes one selected from a group including an audio conference call, a video conference call, a web-based conference call, and a chat-based conference call, and wherein the at least one modality of the conference call is associated with a sidebar.

3. The method of claim 1 wherein obtaining the request comprises obtaining the request through a user interface that comprises a reconference key, the reconference key being arranged to be selected to initiate the request, and wherein the reconference key is displayed on the endpoint, the endpoint being a phone device.

4. The method of claim 1 further comprising obtaining at least one selected option to use in re-establishing the variation of the conference call, wherein the at least one selected option is selected from a group comprising a conference call type, a conference call participant, and a sidebar.

5. The method of claim 1 wherein the conference call is a scheduled conference call or an ad hoc conference call.

6. The method of claim 1 wherein updating the previously stored information includes updating the previously stored information after the time of termination for the conference call.

7. The method of claim 1 wherein the conference call is purposefully terminated by all participants associated with the conference call.

8. Logic embodied on a tangible media that when executed is operable to:

store information associated with a conference call in a memory of a conference server, wherein the conference call is not active, the information being state information at a time of termination for the conference call, wherein the logic operable to store the information associated with the conference call is operable to update previously stored information associated with the conference call, and wherein the information is stored to enable access to the information when re-establishing the conference call in its entirety and the information comprises a second set of states associated with the conference call, the second set of states including the state information at the time of termination for the conference call;

obtain a request to re-establish the conference call on an endpoint;

determine when the request to re-establish the conference call is a request to recreate the conference call in its entirety;

re-establish a variation of the conference call using the conference server when it is determined that the request to re-establish the conference call is not the request to recreate the conference call in its entirety; and re-establish the conference call in its entirety using the conference server and using the information to set a first set of states upon obtaining the request to re-establish the conference call when it is determined that the request to re-establish the conference call is the request to recreate the conference call in its entirety, the first set of states including an overall type of the conference call and at least one modality of the conference call, the first set of states being set to be the second set of states, wherein the logic operable to re-establish the conference call in its entirety using the conference server causes participants in the conference call at the time of termination of the conference call to be involved in the re-established conference call.

9. The logic of claim 8 wherein the logic operable to re-establish the conference call in its entirety is further operable to automatically re-establish the conference call in response to the request, wherein the overall type of the conference call includes one selected from a group including an audio conference call, a video conference call, a web-based conference call, and a chat-based conference call, and wherein the at least one modality of the conference call is associated with a sidebar.

10. The logic of claim 8 wherein the logic operable to obtain the request is further operable to obtain the request through a user interface that comprises a reconference key, the reconference key being arranged to be selected to initiate the request.

11. The logic of claim 8 further operable to obtain at least one selected option to use in re-establishing the variation of the conference call, wherein the at least one selected option is selected from a group comprising a conference call type, a conference call participant, and a sidebar.

12. The logic of claim 8 wherein the conference call is a scheduled conference call or an ad hoc conference call.

13. An apparatus comprising:

a conference call interface;

a memory, the memory being arranged to store information associated with a terminated conference call, the information being state information at a time of termination for the conference call;

reconferencing logic, the reconferencing logic being arranged to access the information associated with the terminated conference call, the reconferencing logic further being arranged to re-establish the terminated conference call in response to a request, wherein the reconferencing logic is arranged to determine whether the request is to re-establish the terminated conference call in its entirety and arranged to re-establish the terminated conference call in its entirety using the conference call interface and the information, and wherein the information is stored in the memory to enable access to the information when re-establishing the conference call in its entirety and the information comprises a second set of states associated with the conference call, the second set of states including the state information at the time of termination for the conference call; and a first reconference key, the first reconference key being arranged to be selected to initiate re-establishing the terminated conference call in its entirety when it is determined that the request is to re-establish the terminated conference call in its entirety, wherein re-establishing the terminated conference call in its entirety include setting a first set of states to be the second set of states, the first set of states including an overall type of the terminated conference call and at least one modality of the conference call, the first reconference key further being arranged to be selected to initiate re-establishing a variation of the conference call when it is determined that the request is not a request to re-establish the terminated conference call in its entirety.

14. The apparatus of claim 13 wherein the conference call interface is arranged to communicate with a conference server, and the reconferencing logic is arranged to cooperate with the conference server to re-establish the terminated conference call to be of the overall type of the terminated conference call and to have at least one modality of the terminated conference call.

15. The apparatus of claim 13 further comprising a display screen, wherein the reconferencing logic is arranged to display a list of terminated conference calls on the display screen, the list of previous conference calls including the terminated conference call.

16. The apparatus of claim 15 wherein the reconferencing logic is arranged to obtain a selection of the terminated conference call, and to display at least one selectable option associated with the terminated conference call on the display screen in response to the selection of the terminated conference call if it is determined that the request is not to re-establish the terminated conference call in its entirety.

17. The apparatus of claim 16 wherein the reconferencing logic utilizes the information to identify the at least one selectable option to display, and wherein the at least one selectable option includes at least a first option associated with a sidebar.

18. The apparatus of claim 13 further comprising a second reconference key, wherein the first reconference key is arranged to initiate re-establishing the terminated conference call when the terminated conference call is an ad hoc conference call and the second reconference key is arranged to initiate re-establishing the terminated conference call if the terminated conference call is a scheduled conference call.

19. The apparatus of claim 13 wherein the apparatus is a voice over internet protocol (VoIP) phone, the VoIP phone including a display screen, wherein the first reconference key is displayed on the display screen.

20. The apparatus of claim 13 wherein the terminated conference call includes a plurality of modalities, the reconferencing logic being arranged to re-establish the terminated conference call to include the plurality of modalities when it is determined that the request is to re-establish the terminated conference call in its entirety.

21. The apparatus of claim 20 wherein the plurality of modalities includes at least a text chat between at least two participants in the first terminated conference call.

* * * * *